Sept. 4, 1956            L. ARNETT            2,761,200

COFFEE BREWER

Filed Feb. 12, 1953            8 Sheets-Sheet 1

Inventor:
Leslie Arnett,
By Schroeder, Merriam, Hofgren & Brady, Attys.

Sept. 4, 1956
L. ARNETT
2,761,200
COFFEE BREWER
Filed Feb. 12, 1953
8 Sheets-Sheet 2
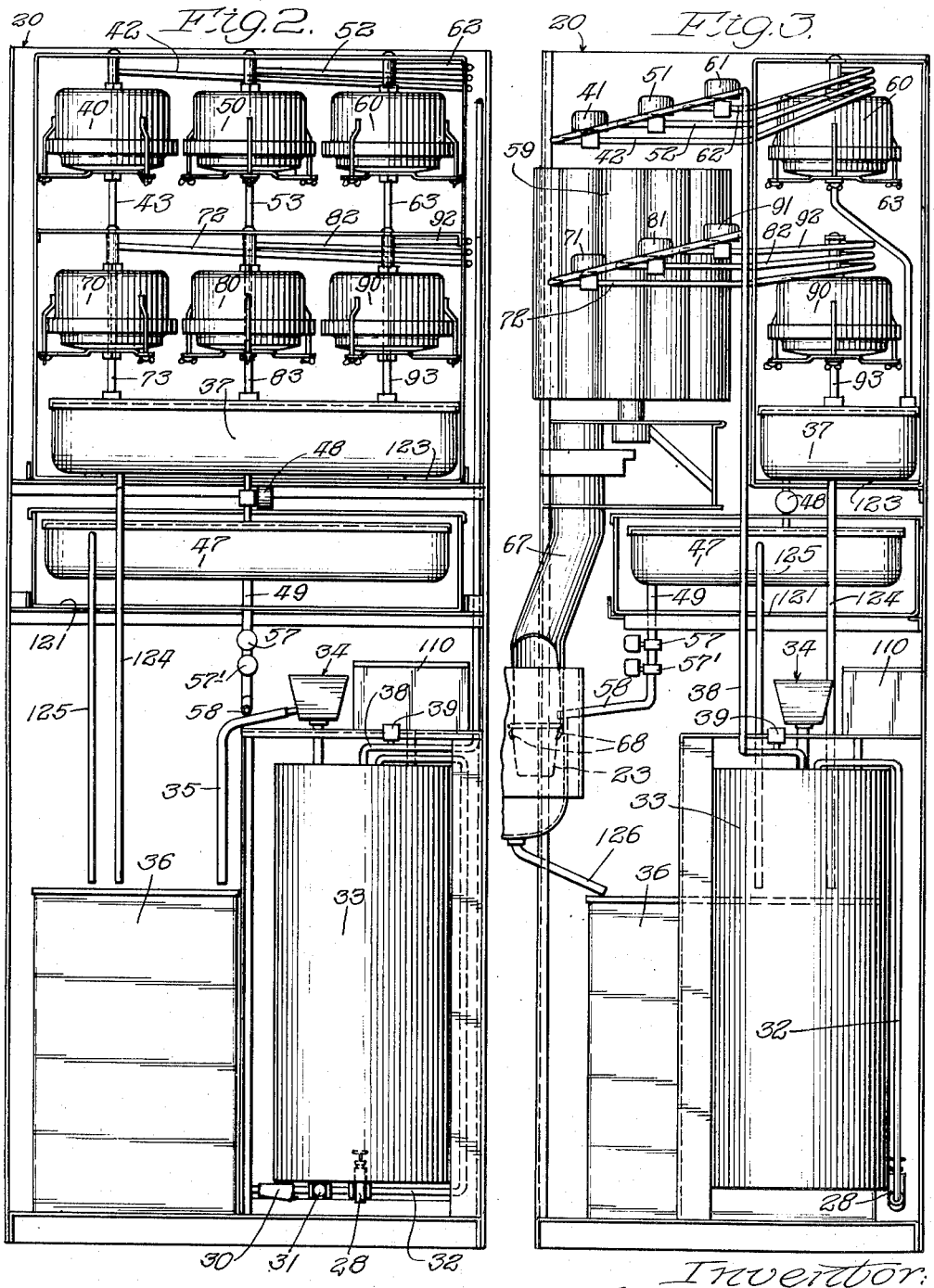
Inventor:
Leslie Arnett,
By Schroeder, Merriam,
Hofgren & Brady, Attys

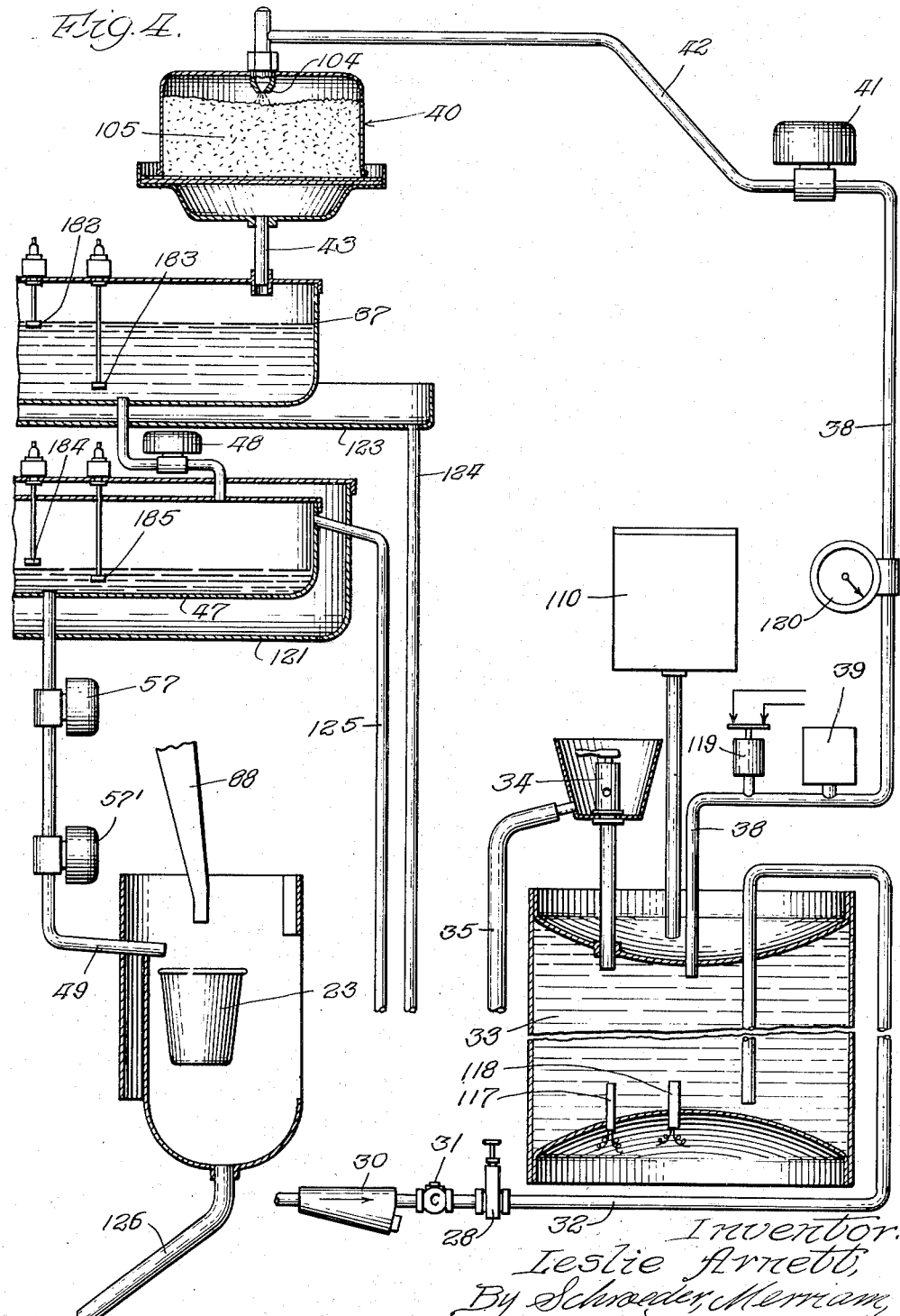

Sept. 4, 1956

L. ARNETT 2,761,200

COFFEE BREWER

Filed Feb. 12, 1953

Inventor:
Leslie Arnett,
By Schrader, Merriam,
Holgren & Brady, Attys.

Sept. 4, 1956 L. ARNETT 2,761,200
COFFEE BREWER
Filed Feb. 12, 1953 8 Sheets-Sheet 5

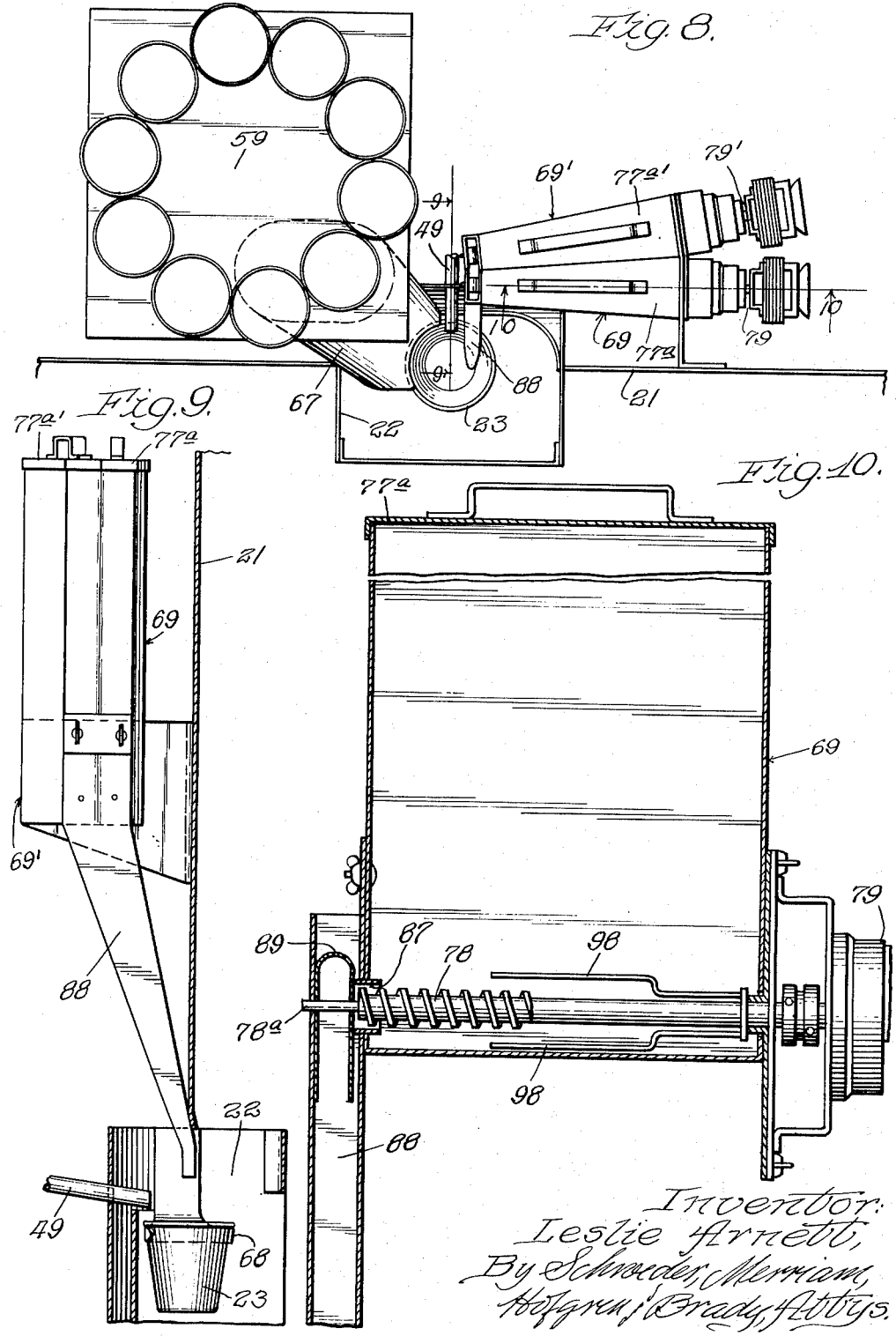

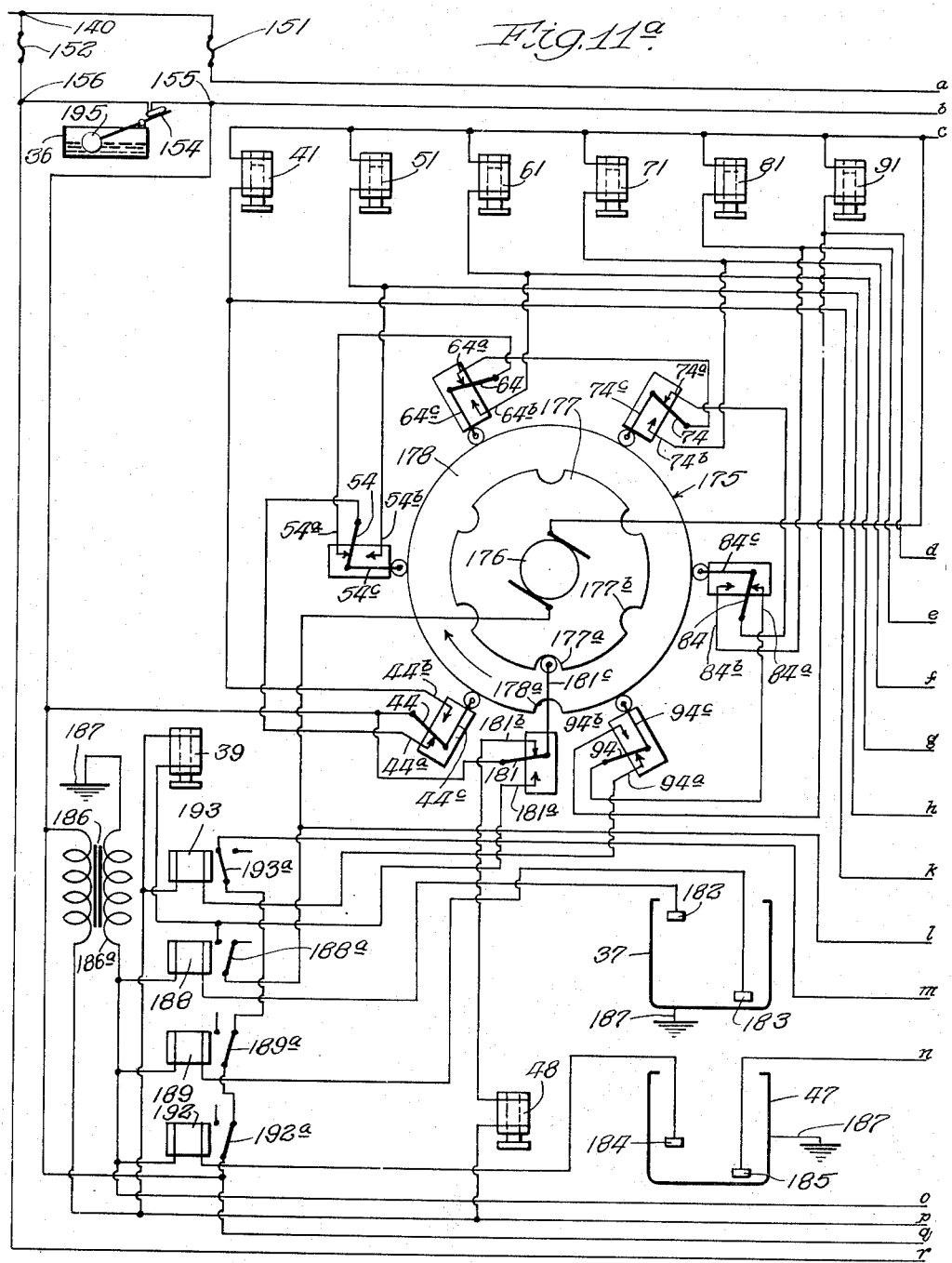
Fig. 11ª

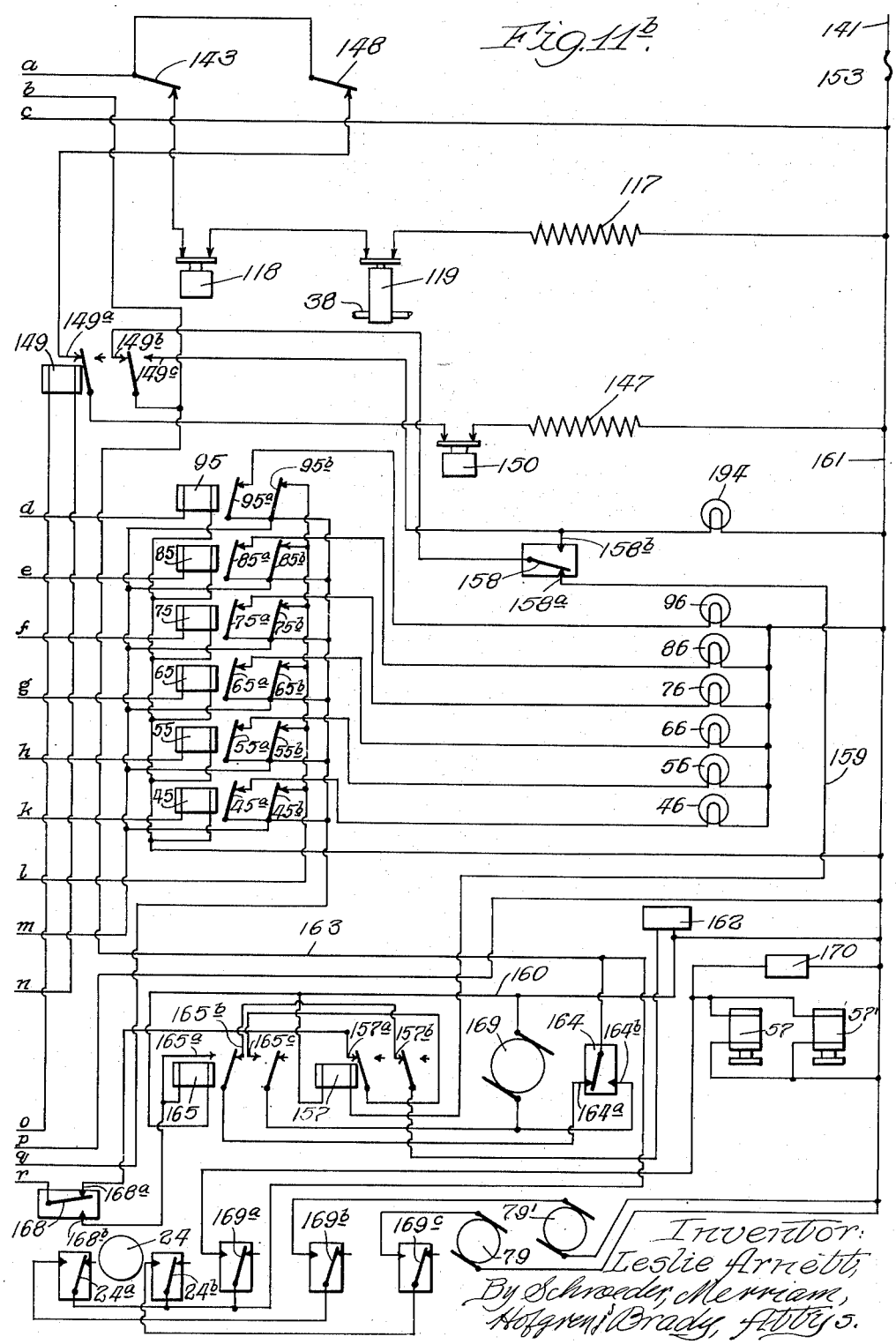

ured Sept. 4, 1956

United States Patent Office 2,761,200

2,761,200

COFFEE BREWER

Leslie Arnett, Chicago, Ill., assignor to United Coffee Corp., a corporation of Illinois Application February 12, 1953, Serial No. 336,563

17 Claims. (Cl. 99—283)

This invention relates to beverage brewing apparatus and more particularly to an apparatus which automatically brews and dispenses fresh coffee.

Beverage dispensers generally are well-known and there are coffee dispensers in use which mix powdered instant coffee with hot water for each individual cup dispensed. The quality of such coffee, however, generally is not as good as that of coffee brewed directly from the ground coffee bean. I have invented and am herein disclosing and claiming an apparatus for brewing coffee in quantities and under pressure, directly from the ground coffee bean, for storing and dispensing this brewed coffee and for brewing a fresh batch of coffee when needed. It is to be understood that although I speak of my apparatus primarily in connection with coffee brewing it is equally well adapted for the brewing of other beverages such as tea and the like.

One feature of my invention is that it provides a plurality of sealed brewing pots, a source of heated water under pressure and control means for selectively connecting the source of heated water to the brewing pots. Another feature is that pipe means connect the source of heated water to each of the brewing pots and electrically operated valve means automatically sequentially introduce heated water through said pipe means to each of said brewing pots. A further feature is that a dispensing tank is provided which is adapted to receive the brewed beverage and from which the beverage may be dispensed, a fresh supply of the beverage being brewed in accordance with the quantity of beverage in the dispensing tank. And another feature of my invention is that a mixing tank is provided which is normally connected to the dispensing tank, but which is isolated therefrom during the brewing process to prevent the strong first brewed beverage from being dispensed. And a further feature is that safety means are provided which prevent brewing a fresh batch of beverage when the measuring tank is not empty. Another feature is that a waste tank is provided which receives any leakage or overflow from the system and means are associated with the waste tank to disable the apparatus when the level of liquid in the tank reaches a predetermined point. A further feature of my invention is that it provides a brewing pot comprising two members, adapted to be sealed together, having readily connectable inlet and outlet fittings and a filter over the outlet.

Further features and advantages of my invention will be readily apparent from the specification and from the drawings in which:

Figure 2 is a front elevational view of the apparatus of Figure 1 with the door and cup dispenser apparatus removed to show the arrangement of the elements in the interior;

Figure 3 is a side elevational view looking from the right in Figure 2 with the cup dispenser and portion of the door in place;

Figure 4 is a fragmentary flow sheet illustrating the operation of my invention;

Figure 8 is a top plan view of the structure of Figure 7 with the back of the front panel shown;

Figure 9 is a fragmentary vertical section taken along line 9—9 of Figure 8;

Figure 10 is a fragmentary vertical section taken along line 10—10 of Figure 8; and Figure 11 (11a and 11b) is a schematic diagram of a control circuit used with my apparatus.

Figure 1:
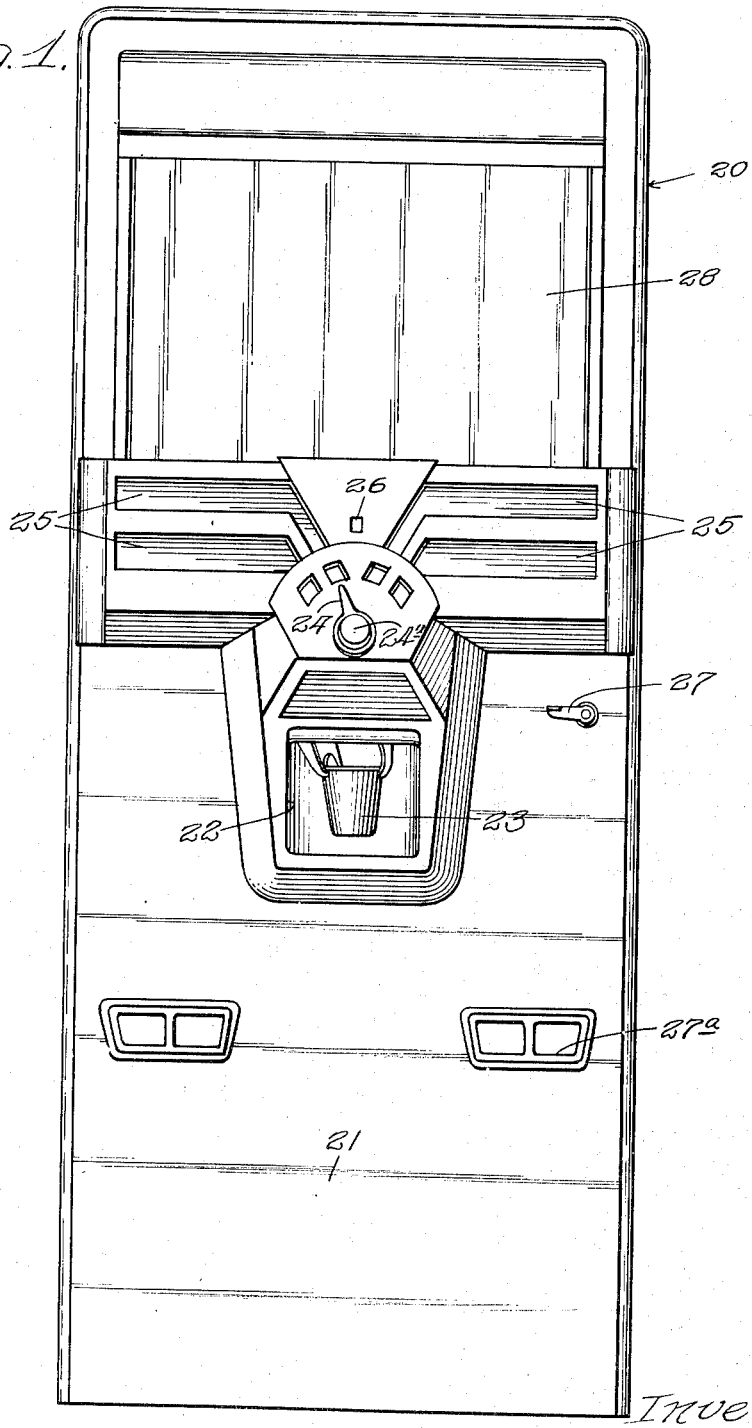
Figure 1 is a front elevation of a brewer and dispenser embodying my invention.

Referring now to the drawings, a housing 20 contains the various elements of my apparatus and has a front panel 21 which may be hingedly mounted to provide access to the interior. The front panel 21 has an access opening 22 therein through which a customer may receive a cup 23 of coffee. A selector 24, which may have a lighted center dial 24a, permits a customer to choose the drink he desires, as indicated on the display panels 25, for example black coffee, coffee with cream, coffee with sugar, or coffee with cream and sugar. A coin slot 26 is adapted to receive the proper coin from the customer to initiate a dispensing operation; and coin return mechanism 27 allows the customer to deflect bent coins or the like through the coin return opening 27a. The panel 28 may contain an advertising display.

Referring now to Figures 2, 3 and 4, water is introduced to the apparatus from a source such as a water main, not shown, through strainer 29, check valve 30, pressure reducing valve 31 and inlet pipe 32 into a water heater 33. A pressure and temperature operated relief valve 34 connected to the water heater 33 prevents excessive pressures or temperatures from building up within the heater; any overflow from the relief valve 34 will pass through pipe 35 into waste tank 36.

A plurality of brewing pots 40, 50, 60, 70, 80 and 90 are mounted in two tiers in the upper rear portion of the housing 20. Hot water may be delivered from the water heater 33 to each of the brewing pots through delivery pipe 38, electrically operated safety valve 39, individual electrically operated pot valves 41, 51, 61, 71, 81 and 91, and individual pot inlet pipes 42, 52, 62, 72, 82 and 92. A first storage tank or measuring tank 37 is mounted below the brewing pots and is adapted to receive the brewed coffee therefrom through pot outlet pipes 43, 53, 63, 73, 83 and 93. A second storage tank or warming tank 47 is mounted below the first storage tank 37 and receives the coffee therefrom through measuring tank outlet valve 48. A dispensing pipe 49 leads from the warming tank 47 through coffee dispensing valves 57 and 57' and has a discharge opening 58 positioned to discharge coffee into cup 23. The brewing pots, storage tanks and piping are preferably made of stainless steel.

Cup dispensing mechanism 59, which may be of any suitable design, is pivotally mounted in front of the brewing pots 40, 50, 60, 70, 80 and 90 and may be swung outwardly when necessary for servicing. Cups 23 which are released from the cup dispensing mechanism 59 fall through cup chute 67 and are caught in jaws 68 at the bottom of the access opening 22, in position to receive coffee from the discharge opening 58.

Cream dispenser 69 and sugar dispenser 69', Figures 7, 8, 9 and 10, are mounted on the back side of the front panel 21. They are identical in construction and operation and only the cream dispenser 69 will be described in detail; corresponding elements of the sugar dispenser will be given the same number as that element of the cream dispenser with an added prime notation. Cream dispenser 69 has a container 77 that holds a quantity of powdered cream and a dispensing worm 78 which is driven by a motor 79; a cover 77a closes the top of the container. When the motor 79 is energized, it turns the worm 78 which forces a quantity of powdered cream through the opening 87 from which it is allowed to fall through a chute 88 into the cup 23. A leaf spring 89 mounted on an extension 78a of the worm 78 covers the outlet opening 87 when the dispenser is not in operation to prevent moisture from causing the powdered cream to cake. The force of the powdered cream driven by the worm 78 pushes the spring away from the outlet opening 87 and the cream falls through the chute 88 into cup 23. As shown in Figure 9, granulated sugar from the sugar dispenser 69' also falls through chute 88 into cup 23. Springs 98 turn with the worm 78 and agitate the powdered cream, to keep it feeding properly and to prevent caking.

Figure 5:
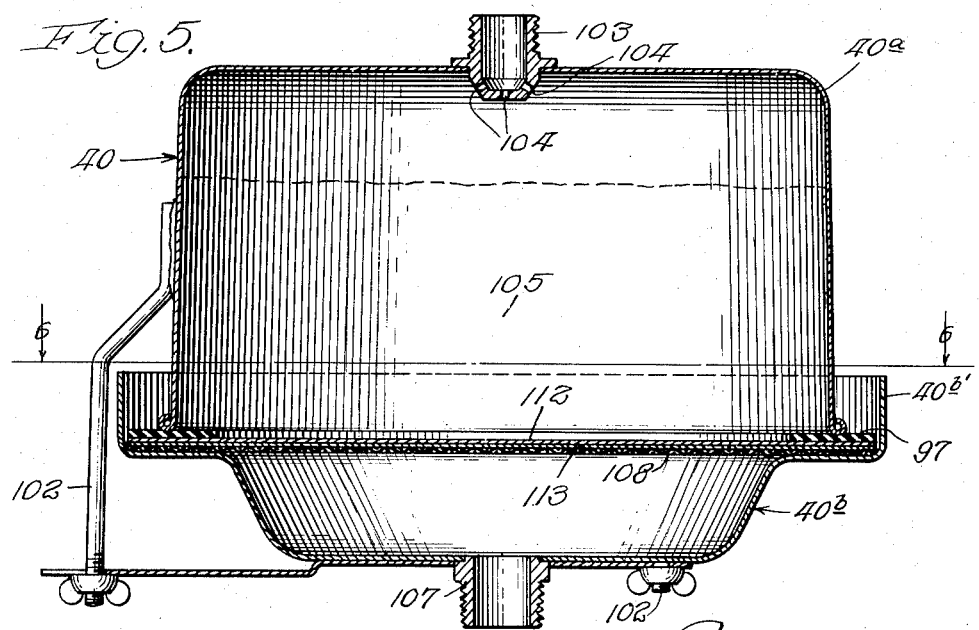
Figure 5 is a vertical section of a brewing pot.
Figure 6:
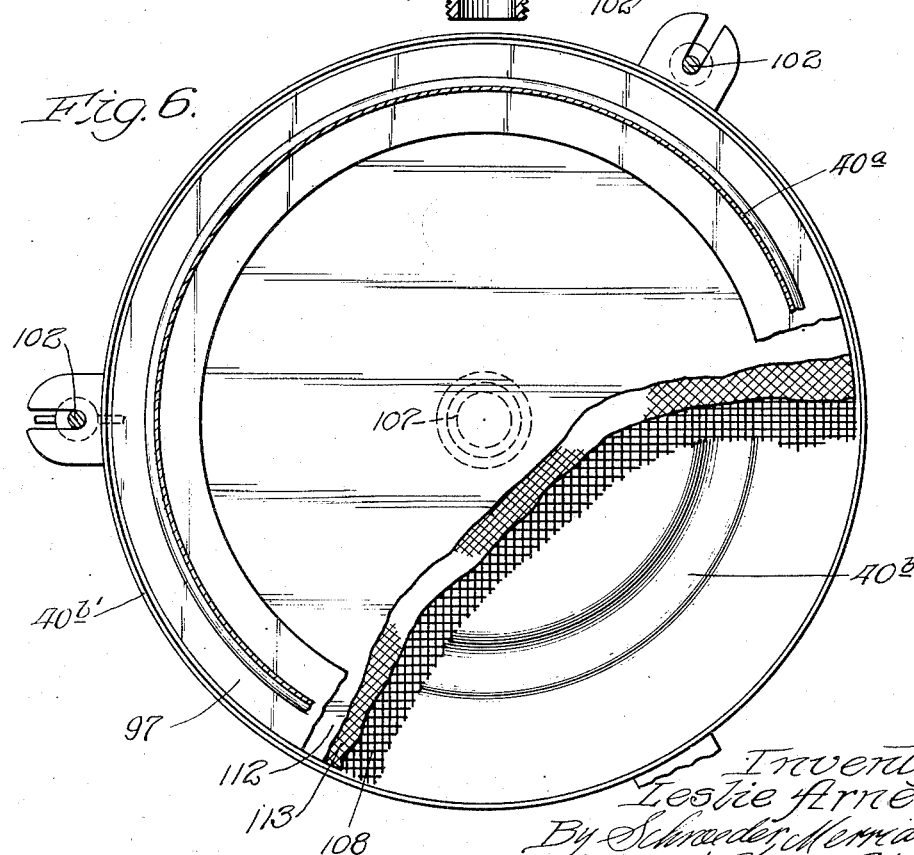
Figure 6 is a horizontal section of a brewing pot taken along line 6—6 of Figure 5, with a portion of the filter broken away.
Figure 7:
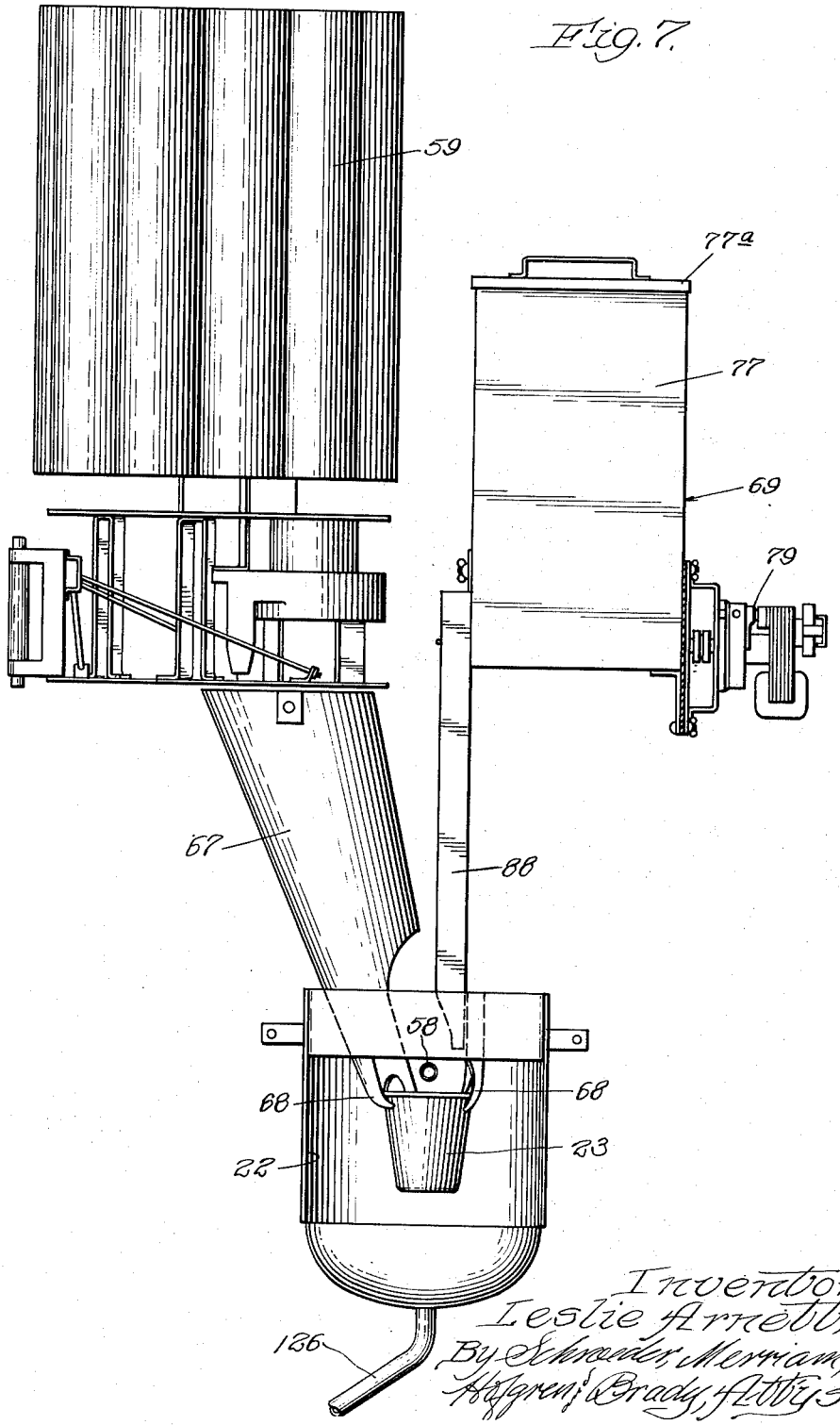
Figure 7 is a front elevational view of the cup dispenser, cup support and sugar and cream dispenser with the back of the front panel removed.

Referring now to Figures 5 and 6, a brewing pot 40 is made up of a first member or cover 40a and a second member or base 40b which are held together in tightly sealed relationship by bolts 102. A threaded inlet fitting 103 in the cover member 100 is adapted to be coupled to the pot pipe 42, through which heated water is introduced to the brewing pot. Openings 104 in the inlet fitting 103 cause the incoming water to be sprayed, under pressure, over the ground coffee 105. The base member 40b is generally dish shaped and has an upwardly extending peripheral rim 40b'. A threaded outlet fitting 107 in the base member 40b is adapted to be connected to an outlet pipe 43 which leads to the measuring tank 37.

Threaded fittings 103 and 107 are used on the brewing pots so that the pots may readily be removed for washing and recharging with ground coffee after they have been used.

A wire screen 108 of rather fine mesh is placed in the dished portion of the base 40b to support the filter elements. The filter itself is made up of a sheet of tightly woven filter paper 112 which is placed over filter cloth 113 on top of the screen 108. The paper 112 performs substantially all of the filtering and the major purpose of the cloth 113 is to prevent the paper from tearing. Resilient gasket 109, which may be of rubber, insures a tight seal between the cover 40a and the base 40b of the brewing pot. The tightly woven paper filter 112 removes all particles of the coffee bean from the infusion before it passes to the measuring and dispensing tanks 37 and 47. As a result, the coffee does not become bitter even though it may stand in the tanks for several days.

Referring now to the flow sheet, Figure 4, cold water comes from a pressurized main, as a city water supply main, not shown, through a strainer 30, check valve 31, pressure reducing valve 28 and inlet pipe 32 which extends downwardly to a point near the bottom of the water heater 33. An air buffer tank 110 is connected to the top of the heater. Water is heated, preferably to a temperature of 180° F., by an electrical heating element 117 controlled by thermostat 118. Associated with the delivery pipe 38, which conducts the water to the brewing pot 40 during the brewing cycle, are a pressure operated switch 119, safety valve 39, and pressure indicator 120. When safety valve 39 and pot valve 41 are both open, the heated water will flow through delivery pipe 38 and pot pipe 42 to the brewing pot 40 where it will be sprayed, through openings 104, over the ground coffee 105. Since the brewing pot 40 is sealed, the heated water will be forced, preferably under a pressure of about 5 pounds per square inch, to percolate down through the grounds 105 to brew the coffee. The infusion or liquid coffee passes on through the filter paper 112, filter cloth 113 and outlet pipe 43 into the first storage tank or measuring tank 37. When measuring tank outlet valve 48 is opened after the brewing cycle is completed the coffee may flow on into the heated warming tank 47. This tank is surrounded by an outer casing 121 to prevent unnecessary loss of heat. The coffee dispenser valves 57 and 57', two being used to prevent loss of coffee if one should become jammed open, control the flow of coffee through the dispensing pipe 49 from which it goes to the cup 23 where it mixes with cream and sugar, if selected, which is delivered through the chute 88.

When the level of the coffee in the warming tank 47 falls below a predetermined point, a brewing cycle is started. At this time an automatic selector switch, to be described later, connects the source of heated water to an unused brewing pot and at the same time the measuring tank outlet valve 48 is closed. The hot water is allowed to flow to the brewing pot, through the coffee therein, and on into the measuring tank 37 until the level of the coffee in the measuring tank reaches a predetermined point, as described above. At this time both the pot valve and the safety valve 39 are closed and the flow of heated water is stopped; and the measuring tank outlet valve 48 is opened allowing the brewed coffee to flow from the measuring tank into the warming tank 47. When the level of the coffee in the warming tank again falls below the predetermined point, the process is repeated with a different one of the brewing pots. This continues until all of the pots have been used.

As previously stated, I prefer to brew coffee with water under pressure of about five pounds per square inch. By the very nature of my apparatus, the water standing in the pot pipes 42, 52, 62, 72, 82 and 92 will be cooled below the temperature of 180° F., before it is sprayed into a pot. This small amount of cool water spread over the grounds at the beginning of the brewing improves the quality of the coffee. It is preferable to keep the measuring tank outlet valve 48 closed during brewing to prevent the first brewed coffee, which may be very strong, from entering the warming tank 47 before it has been diluted with the remaining infusion. A circuit for providing this control will be described later.

Any condensation from the brewing pots 40, 50, 60, 70, 80 and 90, and the measuring tank 37, or leakage from any improperly tightened fittings, is collected in a drip pan 123 from which it is conducted to the waste tank 36 through a drain pipe 124; likewise, any overflow from the warming tank 47 is conducted to the waste tank through overflow pipe 125; and any liquid spilled from the cup 23 flows into the waste tank through pipe 126. (Figure 3). As was formerly pointed out, the overflow from the pressure relief valve 34 also flows into the waste tank 36. As will appear more fully later, when the level of liquid in the waste tank reaches a predetermined point the apparatus is disabled.

Referring now to the control circuit, Figures 11a and 11b, connection between the two portions of the circuit are indicated by like letters associated with connecting wires. The circuit is energized by connecting terminals 140 and 141 to a source of power, for example 110 volts A. C.

The heater element 117, which is associated with the water heater 33, is energized through a manual switch 143, thermostatic control switch 118 and pressure switch 119. Normally, the thermostat 118 will keep the heating element 117 operating at the proper temperature. If, in the event of a failure of the thermostat 118, the temperature or pressure rise abnormally the relief valve 34 should open and remedy the situation. If, however, the relief valve should fail to function properly, a pressure operated switch 119 connected in the delivery line 38 will open and deenergize heater 117, allowing the water in heater tank 33 to cool. The operating pressure of the switch 119 is preferably higher than that of the relief valve 34. Heater element 147 is associated with the warming tank 47 and is energized through manual switch 148, normally closed contact 149a of "sold-out" relay 149, and thermostat 150. The operation of "sold-out" relay 149 will be described later. The heater circuit is provided with a fuse 151 to protect against excessive current drain. The remainder of the circuit is energized through the main fuses 152 and 153.

Assuming that the overflow switch 154, associated with the waste tank 36 is closed, the circuit will be in condition for operation. The dispensing operation will be considered first.

A disabling relay 157 is normally energized from one side of the line 155 through wire b, normally closed contact 149b of the "sold-out" relay 149, contact 158a of the mechanically operated cup supply switch 158, wire 159 and wire 160 back to the other side of the line 161. Thus, contacts 157a and 157b associated with the disabling relay are normally closed as shown in the drawings. The coin reject magnet 162 is normally energized from wire b, through wire 163, contact 164a of the cup motor switch 164, contact 165b of the cup motor relay 165, and contact 157b of the disabling relay. When a coin is inserted in the slot 26 and is passed by the coin reject magnet 162, it strikes the coin switch 168 and moves it momentarily to the dotted line position shown in the drawings. With the coin switch 168 in this dotted line position, the cup motor relay 165 is energized from one side of the line 156, through contact 168b and wire 160 back to the other side of the line 161. This opens contact 165b, to deenergize the coin reject magnet 162 preventing interruption of the dispensing cycle by the insertion of another coin; and closes contacts 165a, a holding contact, and 165c in the circuit of cup motor 169. After the coin passes, the coin switch 168 returns to its normal position closing contact 168a which energizes the cup motor 169 through contact 157a of the disabling relay and contact 165c of the cup motor relay.

Associated with the cup motor 169 are four mechanically operated switches 164, 169a, 169b and 169c which are closed and opened by a series of cams mounted on the shaft of the motor. As the cup motor 169 begins to turn, the coffee switch 169a will be closed energizing the coffee dispensing valves 57 and 57' and operating the counter 170. Shortly after switch 169a is closed, switches 169b and 169c, associated with the cream and sugar dispenser motors 79 and 79' respectively will be closed. Before the coin was inserted, the selector 24 was adjusted to select the desired drink; for example, if both cream and sugar were selected both switch 24a, in the sugar circuit, and switch 24b, in the cream circuit, were closed. The cams associated with switches 169b and 169c keep these switches closed for a sufficient length of time to dispense the proper quantity of sugar and cream and then open them again, stopping the cream and sugar motors 79 and 19'. After a cup of coffee has been dispensed the cam associated with switch 169a will open this switch, closing the coffee dispensing valves 57 and 57'. The cup motor 169 continues to run and the cam associated with cup motor switch 164 opens contact 164a which breaks the circuit to cup motor relay 165 deenergizing it and opening holding contact 165a and contact 165c in the cup motor circuit; at the same time, contact 164b is closed. The cup motor 169 continues to run until the cam associated with cup motor switch 164 reopens contact 164b and closes contact 164a; the dispensing circuit is now ready to begin another cycle.

The dispensing cycle may be summarized as follows. A coin inserted in the slot momentarily operates coin switch 168 to energize the cup motor relay 165, and then the coin switch returns to its original position to energize the cup motor. A series of cams driven by the cup motor 169 operate switches 169a, 169b and 169c to dispense the desired beverage. A fourth cam driven by the cup motor 169 operates the cup motor switch 164 to stop the cup motor and return the dispensing circuit to its normal condition.

When the level of coffee in the warming tank 47 falls below a predetermined point it is necessary to brew a fresh batch of beverage. The control circuit for this portion of the operation will now be described. We will assume that all six of the brewing pots contain a fresh supply of ground coffee.

The automatic sequential brewing process is controlled by a step timer switch indicated generally as 175. This switch includes a step switch motor 176 that drives a pair of discs 177 and 178, a plurality of single pole, double throw pot switches 44, 54, 64, 74, 84, and 94 and a single pole, double throw alternate switch 181. The motor 176 drives the discs 177 and 178 in a clockwise direction, as shown in the drawings; in the position shown the system is ready to begin the brewing cycle with the brewing pot 40.

The operation of the brewing circuit is controlled by electrodes 182 and 183 in the measuring tank 37 and electrodes 184 and 185 in the warming tank 47. As will presently appear, a relay is associated with each of these electrodes and each relay will be energized when the coffee in the tanks 37 and 47 covers the bottom end of the associated electrode, the circuit of each relay being completed through the relatively high resistance of the liquid coffee. A transformer 186 provides the necessary voltage for operating the relays used in this secondary control circuit, and secondary 186a of the transformer has one end grounded at 187; tanks 37 and 47 are also grounded to complete the circuit. The secondary control circuit is thus isolated; protecting the users of the machine from any possible shock.

Assuming that the apparatus has brewed a batch of coffee and that this coffee has all been transferred to the warming tank 47, there will be sufficient coffee in this tank to cover the lower ends of both electrodes 184 and 185. Electrode 185 is positioned adjacent the bottom of warming tank 47 and is associated with the "sold-out" relay 149. Thus, so long as there is any coffee remaining to be dispensed, "sold-out" relay 149 will be energized and contacts 149a and 149b associated therewith will be closed. These contacts are in the circuits of the warming tank heater element 147 and the disabling relay 157, respectively.

Normally, when coffee is not being brewed the measuring tank 37 will be empty, and the brewing stop relay 188, associated with electrode 182, and the safety relay 189, associated with electrode 183, will be deenergized and their contacts 188a and 189a, respectively, will be in the position shown in the drawings.

When the level of the coffee in the warming tank 47 falls below the electrode 184, the brewing start relay 192 will be deenergized and the associated contact 192a will close, as shown. Electrode 184 may be positioned any desired distance above the bottom of warming tank 47, for example a sufficient distance to deenergize relay 192 when 25 cups of coffee remain in the tank. This coffee may be dispensed during the brewing process. The brewing process is preferably begun before the warming tank 47 is empty in order that the dispensing apparatus will not have to be shut down while waiting for a fresh supply of coffee.

When the level of coffee falls below electrode 184 and deenergizes the brewing start relay 192, a circuit is completed from the line 155, through contact 192a, contact 189a, contact 193a of normally energized motor stop relay 193, wire m, one or more of the contacts 45b, 55b, 65b, 75b, 85b and 95b and wire 1 to energize the step motor 176. The normally energized motor stop relay 193 is connected in series with contacts 44a, 54a, 64a, 74a, 84a and 94a across the source, and so long as the step switch is in the position shown, this relay will be energized. The measuring tank outlet valve 48 is energized through contact 181b of the alternate switch 181.

When the step switch motor 176 is energized, the discs 177 and 178 will turn in a clockwise direction. The plunger 181c associated with alternate switch 181 will move out of the depression 177a, opening contact 181b to close the measuring tank outlet valve 48 and will at the same time close contact 181a to open the safety valve 39. The step motor 176 will continue to turn until the plunger 44c of brewing pot switch 44 enters the depression 178a, opening contact 44a and closing contact 44b. Contact 44a is in the circuit of the motor stop relay 193; as 44a is opened, relay 193 will be deenergized and its associated contact 193a will open deenergizing the step motor 176. At the same time, contact 44b of brewing pot switch 44 will close in turn energizing the individual pot valve 41 and pot relay 45. Since both the safety valve 39 and the pot valve 41 are open, heated water will flow through delivery pipe 38, and pot pipe 42 to sealed brewing pot 40, where it is sprayed over ground coffee 105. The brewed coffee from brewing pot 40 will flow through the outlet pipe 43 into the measuring tank 37. The pot relay 45, which was also energized when contact 44b of the pot switch was closed, opens contact 45b in the brewing start circuit and contact 45a which is associated with an indicator light 46. The relays 45, 55, 65, 75, 85 and 95 are preferably of the manually reset type; that is, once they have been energized and their contacts opened they must be manually reset to close the contacts. The reason for this will be apparent later.

As the brewing process continues, the level of coffee will rise in the measuring tank 37 until it reaches the brewing stop electrode 182. When this occurs, the brewing stop relay 188 will be energized and its associated contact 188a will be closed. This completes a circuit through contact 181a of the alternate switch, which is closed at this time, to energize the step switch motor 176. The motor will begin to turn and the plunger 44c of pot switch 44 will be raised out of the depression 178a to open contact 44b and deenergize the pot relay 41, stopping the brewing process. The motor will continue to turn until the operating plunger 181c of alternate switch 181 enters depression 177b. This opens contact 181a and stops the step switch motor 176 and closes the safety valve 39. At the same time contact 181b is closed energizing the measuring tank outlet valve 48 to allow the brewed coffee to pass from the measuring tank 37 into the warming tank 47. It is desirable to isolate these two tanks during the brewing process so that the relatively strong first brewed coffee may be diluted by the weaker later brewed coffee before it is dispensed, as has been pointed out previously.

The brewing control circuit is now ready to begin another brewing cycle, as soon as the level of the coffee in the warming tank 47 again falls below the level of electrode 184. The brewing cycle operates successively in the same manner with brewing pots 50, 60, 70, 80 and 90 and will not be described in detail.

As was previously mentioned, the pot relays 45, 55, 65, 75, 85 and 95 are of the manually reset type. Since each relay is energized during the period that its associated brewing pot is being used in the brewing process, after all six brewing pots have been used, all six of the contacts 45b, 55b, 65b, 75b, 85b and 95b will be opened. These contacts are in series with the step motor 176 in the brewing start circuit and when they have all been opened, a brewing cycle cannot be started. Indicator lights 46, 56, 66, 76, 86 and 96 are deenergized as their respective pots are used and indicate visually to a serviceman which of the pots must be replaced.

Should the warming tank 47 be entirely empty, either during the brewing cycle or when all brewing pots have been used, the "sold-out" relay 149 will be deenergized. This will open contact 149a in the warming tank heater circuit, contact 149b in the energizing circuit of the disabling relay 157 and close contact 149c to light "sold-out" light 194. The "sold-out" light 194 is also energized by the cup supply switch 158, which is a mechanical switch associated with the cup dispensing mechanism 59. When the supply of cups is exhausted contact 158a will be opened deenergizing the disabling relay 157 and closing contact 158b to light the "sold-out" light 194.

In the event some portion of the apparatus fails and the waste tank 36 becomes filled with liquid, the mercury overflow switch 154, which is associated with float 195 will be opened. This deenergizes everything in the apparatus except the heater circuits associated with the water heater 33 and the warming tank 47.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Beverage brewing and dispensing apparatus of the character described, comprising: a plurality of sealed brewing pots; a water heater adapted to be connected to said brewing pots through a safety valve; a source of water under pressure connected to said water heater; a pressure and temperature operated relief valve on said water heater; a first storage tank connected to said brewing pots to receive beverage therefrom; a second storage tank connected to said first storage tank; means for dispensing beverage from said second storage tank, said means having an outlet; a cup support positioned beneath said outlet; control means for connecting said hot water heater to a different one of said brewing pots each time the level of the beverage in said tank falls below a predetermined point; a waste tank; a drip pan associated with said brewing pots and said first storage tank to collect any leakage therefrom; a drain for conducting said leakage from said drip pan to said waste tank; a drain for conducting any overflow from said relief valve to said waste tank; an overflow line connected to said second storage tank for conducting any overflow to said waste tank; a drain line for conducting any leakage from said dispensing means outlet to said waste tank; a float operated switch associated with said waste tank, said switch being opened when the level of liquid in said waste tank reaches a predetermined point, thereby closing said safety valve and disabling said dispensing means and said control means.

2. A unitary beverage preparing and coin-actuated dispensing machine of the character described, which brews beverage from a particulate beverage ingredient, comprising: a plurality of beverage brewing pots, each adapted to contain a quantity of a particulate beverage ingredient; a source of heated brewing water under pressure; valves for connecting each of said brewing pots with said source of brewing water; a storage tank for receiving brewed beverage from said pots; coin-actuated dispensing means for dispensing quantities of beverage from said storage tank; and means responsive to the quantity of beverage in said storage tank for initiating a beverage brewing cycle, said last mentioned means including a rotary step selector switch for selectively actuating said valves to connect said brewing pots sequentially with said source of heated brewing water to prepare fresh quantities of beverage.

3. A unitary beverage preparing and coin-actuated dispensing machine of the character described, which brews beverage from a particulate beverage ingredient, comprising: a plurality of beverage brewing pots, each adapted to contain a quantity of particulate beverage ingredient; a source of heated brewing water under pressure; valves for connecting each of said brewing pots with said source of brewing water; a storage tank for receiving brewed beverage from said pots; coin-actuated dispensing means for dispensing quantities of beverage from said storage tank; and a brewing control circuit operable as a function of the quantity of beverage in said tank and including a rotary, step selector control switch for selectively actuating said valves to connect said brewing pots sequentially with said source of heated brewing water to prepare a fresh quantity of beverage for replenishing the supply of beverage in said storage tank as necessary.

4. A beverage preparing machine of the character described, comprising: a plurality of beverage brewing pots, each adapted to contain a quantity of particulate beverage ingredient; a source of brewing liquid; valve means for connecting each of said brewing pots with said source of brewing liquid; a storage container for receiving beverage from said pots; means for dispensing beverage from said container; and means responsive to the quantity of beverage in said container for initiating a beverage brewing cycle, said last mentioned means including a rotary step control switch controlling said valve means to connect said brewing pots sequentially with said source of brewing liquid.

5. A unitary beverage preparing and coin-actuated dispensing machine of the character described, which brews beverage from a particulate beverage ingredient, comprising: a plurality of beverage brewing pots, each adapted to contain a quantity of particulate beverage ingredient; a source of heated brewing water under pressure; valves for connecting each of said brewing pots with said source of brewing water; a storage tank for receiving brewed beverage from said pots; coin-actuated dispensing means for dispensing quantities of beverage from said storage tank; a brewing start circuit including a plurality of parallel connected switches, one switch for each of said pots; means responsive to the quantity of beverage in said storage tank for initiating a beverage brewing cycle, said last mentioned means including a rotary step selector switch for selectively actuating said valves to connect said brewing pots with said source of heated brewing water in a predetermined sequence to prepare fresh quantities of beverage; and means for opening one of said parallel connected switches each time a pot is used, preventing completion of the brewing start circuit and reuse of said pots when all have been used.

6. A unitary beverage preparing and coin-actuated dispensing machine of the character described, which brews beverage from a particulate beverage ingredient, comprising: a plurality of beverage brewing pots, each adapted to contain a quantity of a particulate beverage ingredient; a source of heated brewing water under pressure; valves for connecting each of said brewing pots with said source of brewing water; a mixing tank for receiving brewed beverage from said pots; a storage tank for receiving brewed beverage from said mixing tank; a normally open valve between said tanks; coin-actuated dispensing means for dispensing quantities of beverage from said storage tank; means responsive to the quantity of beverage in said storage tank for initiating a beverage brewing cycle, said last mentioned means including a rotary step selector switch for selectively actuating said valves to connect said brewing pots sequentially with said source of heated brewing water to prepare fresh quantities of beverage; and means actuated by said rotary selector switch for closing the valve between said mixing and storage tanks only during the brewing cycle.

7. A beverage brewing apparatus of the character described, comprising: a source of liquid; a plurality of brewing pots; pipe means interconnecting said source of liquid with said pots; tank means for receiving brewed beverage from said brewing pots; a plurality of electrically operated, normally closed pot valves associated with said pipe means; a source of voltage; a circuit including a multi-position, motor-driven selector switch for connecting said source of voltage to said pot valves; and means responsive to the level of beverage in said tank means for energizing said motor when the level of the beverage falls below a predetermined point to move said selector switch to its next operative position for selectively connecting one of said pot valves to said source of voltage to open said valve and allow liquid to flow into the pot associated therewith.

8. A beverage brewing apparatus of the character described, comprising: a source of liquid; a plurality of brewing pots; pipe means interconnecting said source of liquid with said pots; tank means for receiving brewed beverage from said brewing pots; a plurality of electrically operated pot valves associated with said pipe means; a source of voltage; a circuit, including rotary switch means, for connecting said source of voltage to said pot valves, said switch means selectively connecting said source of voltage to said valves for opening said valves to allow liquid to flow into said pots; means responsive to the amount of beverage in said tank means for actuating said rotary switch means to select and open one of said pot valves when the beverage in the tank means needs replenishing; and means responsive to the level of beverage in said tank means controlling said rotary switch means to close said opened pot valve when the level of the beverage reaches a predetermined point.

9. A beverage brewing apparatus of the character described, comprising: a source of heated water; a plurality of brewing pots; pipe means interconnecting said source of water with said pots; tank means for receiving brewed beverage from said brewing pots; a plurality of electrically operated, normally closed and normally deenergized pot valves associated with said pipe means; a source of voltage; circuit means including a motor-driven, multi-position selector switch for interconnecting said source of voltage and said pot valves; a first circuit, including a switch, for energizing said selector switch motor; means responsive to the amount of liquid in said tank means for closing said last mentioned switch when the tank needs replenishing, energizing said motor to move said selector switch to its next operative position connecting only one of said pot valves to said source of voltage, to energize and open said valve and allow water to flow from said source into the pot associated therewith; a second circuit, including a switch, for energizing said motor; and means responsive to the level of liquid in said tank means for closing said last mentioned switch when the level of liquid reaches a predetermined point, energizing said motor to move said selector switch to a position disconnecting said pot valve from said source of voltage for deenergizing and closing said valve.

10. Beverage brewing apparatus of the character described, comprising: a source of heated water; brewing means; pipe means interconnecting said source of water and said brewing means; a first tank adapted to receive brewed beverage from said brewing means and a second tank adapted to receive brewed beverage from said first tank; electrically operated valve means associated with said pipe means; a source of voltage; a circuit including switch means for connecting said source of voltage to said valve means, said switch means automatically connecting said source of voltage to said valve means for opening said valve means to allow water to flow into said brewing means; an electrically operated, normally open valve between said first tank and said second tank; means responsive to the level of beverage in said second tank controlling said switch means to open said valve means when the level of beverage falls below a predetermined point; means for closing said normally open valve while said valve means are open; and means responsive to the level of beverage in said first tank controlling said switch means to close said valve means when the level of beverage reaches a predetermined point and to open said valve between said first and second tanks.

11. Electrical means of the character described in claim 10 including means for preventing operation of said switch means when beverage remains in said first tank.

12. A unitary beverage preparing and coin responsive dispensing machine of the character described which brews beverage from a particulate beverage ingredient, comprising: beverage brewing means provided with a plurality of beverage ingredient charges; a source of hot water under pressure for brewing fresh beverage; tank means for receiving brewed beverage from said brewing means; a source of electrical power; coin-actuated, electrically operated dispensing means for serving from said tank means a predetermined quantity of beverage on each actuation; waste receiving means for receiving waste leakage and drippage from the various elements of the system; switch means responsive to the quantity of waste in said receiving means for interrupting a connection with said power source; a brewing pot forming a part of said beverage brewing means and containing a charge of said particulate material; means for providing a pressure-tight liquid flow connection between said pot and said source of hot water; and automatic, electrically operated beverage brewing control means, including an electrical circuit having said waste responsive switch means therein, operable as a function of the quantity of beverage in said tank means to initiate and terminate a flow of hot water from said source through said connection and into said pot to prepare a quantity of fresh beverage and replenish the supply of beverage in said tank means in accordance with demand.

13. A unitary beverage preparing and coin responsive machine of the character described, which brews beverage from a particulate beverage ingredient, comprising: beverage brewing means provided with a plurality of beverage ingredient charges; a source of hot water under pressure for brewing fresh beverage; tank means for receiving brewed beverage from said brewing means; a source of electrical power; waste receiving means for receiving waste leakage and drippage from the various elements of the system; switch means responsive to the quantity of waste in said receiving means for interrupting a connection with said power source; coin-actuated, electrically operated dispensing means for serving from said tank means a predetermined quantity of beverage on each actuation and including a circuit having said waste responsive switch means therein; a brewing pot forming a part of said beverage brewing means and containing a charge of said particulate material; means for providing a pressure-tight liquid flow connection between said pot and said source of hot water under pressure; and automatic, electrically operated beverage brewing control means including a circuit having said waste responsive switch therein, and operable as a function of the quantity of beverage in said tank means to initiate and terminate a flow of hot water from said source through said connection and into said pot to prepare a quantity of fresh beverage and replenish the supply of beverage in said tank means in accordance with demand, at least one of the initiation and termination being a function of the level of beverage in said tank means.

14. A unitary beverage preparing and coin responsive dispensing machine of the character described, which brews beverage from a particulate beverage ingredient, comprising: beverage brewing means provided with a plurality of beverage ingredient charges; a source of electrical power; switch means responsive to the quantity of particulate beverage ingredient remaining unused for interrupting a connection with said source of power; a source of hot water under pressure for brewing fresh beverage; tank means for receiving brewed beverage from said brewing means; coin-actuated, electrically operated dispensing means for serving from said tank means a predetermined quantity of beverage on each actuation; waste receiving means for receiving waste leakage and drippage from the various elements of the system; switch means responsive to the quantity of waste in said receiving means; a brewing pot forming a part of said beverage brewing means and containing a charge of said particulate material; means for providing a pressure-tight liquid flow connection between said pot and said source of hot water; and automatic, electrically operated beverage brewing control means including brewing start circuit means having connected therein said waste responsive switch means and said beverage ingredient responsive switch means, operable as a function of the quantity of beverage in said tank means to initiate and terminate a flow of hot water from said source through said connection and into said pot to prepare a quantity of fresh beverage and replenish the supply in said tank means in accordance with demand.

15. A unitary beverage preparing and coin responsive dispensing machine of the character described, which brews beverage from a particulate beverage ingredient, comprising: beverage brewing means including a plurality of removable and replaceable pressure brewing pots each containing a charge of particulate beverage ingredient; a source of hot water under pressure for brewing fresh beverage; tank means for receiving brewed beverage from said brewing means; a source of electrical power; coin-actuated, electrically operated dispensing means for serving from said tank means a predetermined quantity of beverage on each actuation; waste receiving means for receiving waste leakage and drippage from the various elements of the system; switch means responsive to the quantity of waste in said receiving means for interrupting a connection with said power source; means for providing a pressure-tight liquid flow connection between one of said pots and said source of hot water; and electrically operated beverage brewing control means, including an electrical circuit having said waste responsive switch means therein, operable as a function of the quantity of beverage in said tank means to initiate and terminate a flow of hot water from said source through said connection means and into one of said pots to prepare fresh beverage; said means including means for selecting successive ones of said brewing pots on each brewing operation.

16. A unitary beverage preparing and coin responsive dispensing machine of the character described, which brews beverage from a particulate beverage ingredient, comprising: beverage brewing means including a plurality of removable and replaceable pressure brewing pots each containing a charge of particulate beverage ingredient; a source of hot water under pressure for brewing fresh beverage; tank means for receiving brewed beverage from said brewing means; a source of electrical power; waste receiving means for receiving waste leakage and drippage from the various elements of the system; switch means responsive to the quantity of waste in said receiving means for interrupting a connection with said power source; coin-actuated, electrically operated dispensing means for serving from said tank means a predetermined quantity of beverage on each actuation and including a circuit having said waste responsive switch means therein; means for providing a pressure-tight liquid flow connection between one of said pots and said source of hot water; and electrically operated beverage brewing control means, including an electrical circuit having said waste responsive switch means therein, operable as a function of the quantity of beverage in said tank means to initiate and terminate a flow of hot water from said source through said connection means and into one of said pots to prepare fresh beverage, said means including means for selecting successive ones of said brewing pots on each brewing operation.

17. A unitary beverage preparing and coin responsive dispensing machine of the character described, which brews beverage from a particulate beverage ingredient, comprising: beverage brewing means including a plurality of removable and replaceable pressure brewing pots each containing a charge of particulate beverage ingredient; a source of electrical power; switch means responsive to the pressure brewing pots remaining unused for interrupting a connection with said source of power; a source of hot water under pressure for brewing fresh beverage; tank means for receiving brewed beverage from said brewing means; coin-actuated, electrically operated dispensing means for serving from said tank means a predetermined quantity of beverage on each actuation; waste receiving means for receiving waste leakage and drippage from the various elements of the system; switch means responsive to the quantity of waste in said receiving means for interrupting a connection with said power source; means for providing a pressure-tight liquid flow connection between one of said pots and said source of hot water; and electrically operated beverage brewing control means, including an electrical circuit having said waste and pressure brewing responsive switch means therein, operable as a function of the quantity of beverage in said tank means to initiate and terminate a flow of hot water from said source through said connection means and into one of said pots to prepare fresh beverage, said means including means for selecting successive ones of said brewing pots on each brewing operation.

References Cited in the file of this patent

UNITED STATES PATENTS

| Number | Name | Date |
|---|---|---|
| 663,723 | Brown et al. | Dec. 11, 1900 |
| 1,329,712 | Johnson | Feb. 3, 1920 |
| 1,335,048 | Diefendorf | Mar. 30, 1920 |
| 1,552,947 | Petersen | Sept. 8, 1925 |
| 1,621,620 | Bast | Mar. 22, 1927 |
| 1,662,547 | Urtis | Mar. 13, 1928 |
| 1,665,728 | Canright | Apr. 10, 1928 |
| 1,805,159 | Bauer et al. | May 12, 1931 |
| 1,809,899 | Heroy | June 16, 1931 |
| 1,822,433 | Brand | Sept. 8, 1931 |
| 1,869,720 | Strand et al. | Aug. 2, 1932 |
| 1,954,147 | Shroyer | Apr. 10, 1934 |
| 2,014,325 | Grilli | Sept. 10, 1935 |
| 2,048,350 | McLean | July 21, 1936 |
| 2,149,270 | Burgess | Mar. 7, 1939 |
| 2,205,290 | Herrera | June 18, 1940 |
| 2,340,070 | McCauley et al. | Jan. 25, 1944 |
| 2,372,448 | Porteous | Mar. 27, 1945 |
| 2,420,589 | Dunnihoo | May 13, 1947 |
| 2,433,054 | Lime | Dec. 23, 1947 |
| 2,488,817 | Kaminky | Nov. 22, 1949 |
| 2,544,836 | Hotvedt | Mar. 13, 1951 |
| 2,572,541 | Thompson et al. | Oct. 23, 1951 |
| 2,597,063 | Catanzano | May 20, 1952 |
| 2,614,738 | Mills | Oct. 21, 1952 |
| 2,644,478 | Calabrese | July 7, 1953 |
| 2,656,927 | Prendergast | Oct. 27, 1953 |
| 2,682,981 | Melikian | July 6, 1954 |
| 2,682,984 | Melikian et al. | July 6, 1954 |

FOREIGN PATENTS

| Number | Country | Date |
|---|---|---|
| 548,160 | France | Oct. 13, 1922 |
| 593,547 | France | May 29, 1925 |